UNITED STATES PATENT OFFICE.

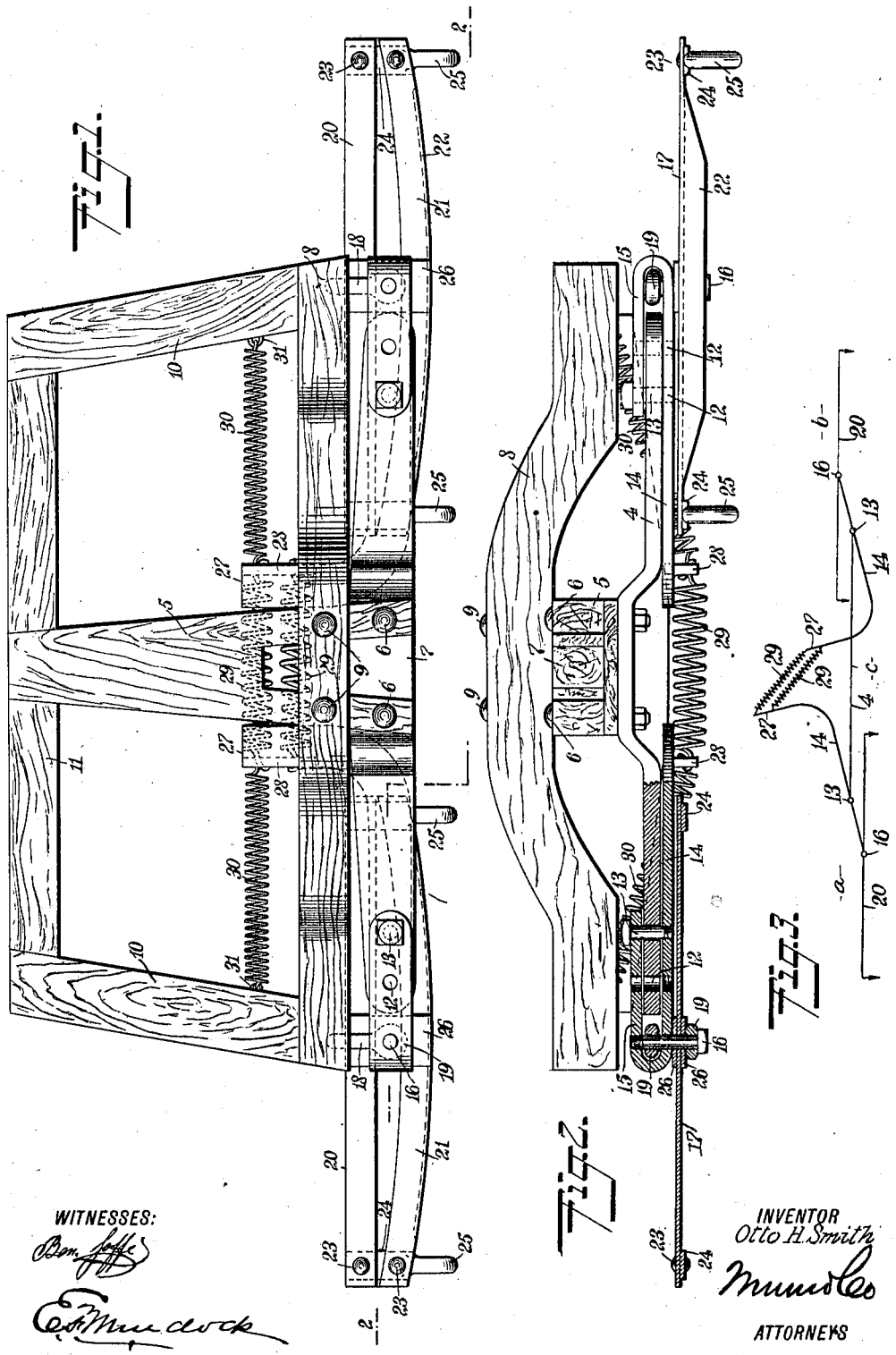

OTTO H. SMITH, OF NEW BRUNSWICK, NEW JERSEY.

WHIFFLETREE.

982,639.  Specification of Letters Patent.  Patented Jan. 24, 1911.

Application filed April 23, 1910. Serial No. 557,153.

*To all whom it may concern:*

Be it known that I, OTTO H. SMITH, a citizen of the United States, and a resident of New Brunswick, in the county of Middlesex and State of New Jersey, have invented a new and Improved Whiffletree, of which the following is a full, clear, and exact description.

Among the principal objects which the present invention has in view are: to provide a whiffle-tree wherein the shoulder load on the team is cushioned; to provide a cushion draft equalizing construction; to provide a construction wherein the equalizing leverage of the swingletrees may be varied; and to provide a construction which is simplified, economical and durable.

One embodiment of the present invention is disclosed in the structure illustrated in the accompanying drawings, in which like characters of reference denote corresponding parts in all the views, and in which—

Figure 1 is a plan view of the forward axle carriage frame provided with a whiffletree constructed and arranged in accordance with the present invention; Fig. 2 is a front elevation of the same, partly in section, the section being taken on the line 2—2 in Fig. 1; and Fig. 3 is a diagrammatic view illustrating in plan the disposition of the parts of the whiffle-tree under extreme conditions.

This invention is particularly applicable to a construction of vehicles for heavy hauling. The method in vogue at present for hitching teams to heavy vehicles is to provide a spring cushion incorporated in the construction of the tugs. The inconvenience of the construction is principally in that, in the manner of handling the harness, the springs, if sufficiently heavy to accomplish the purpose, are bulky and cumbersome, interfering with the proper handling of the harness. In the former construction wherein the whiffle-tree is pivotally mounted in the frame, the entire pulling load is exerted on the frame of the vehicle where the pivot point for the whiffle-tree is located.

In the present invention I have provided a straight bar 4, rigidly mounted on a socket brace 5 by bolts 6, 6. The brace 5 is cut away to form a pole socket 7, and is rigidly secured to a bolster 8 by means of bolts 9, 9. The bolster 8 is united with side frames 10, 10, which are framed into the carriage brace 11, as is the socket brace 5. These members constitute what is herein described as the front axle carriage upon which the fifth wheel and king bolt are mounted. The bar 4, by means of the present construction, forms a substantial reinforcing member for the construction. The bar 4 is provided at the outer ends thereof with perforations 12, 12, adapted to receive pivot bolts 13, 13.

The pivot bolts 13, 13 are mounted in levers 14, 14, and are extended through the upper arms 15, 15 thereof, which are bent back upon themselves to form loops substantially as shown in Fig. 2 of the drawings. In the outer ends of the loops formed by the back-turned ends 15, 15 are mounted pivot bolts 16, 16. The pivot bolts 16, 16 are provided to pivot swingletrees 17, 17, the said bolts passing through the eyes provided in the separated ends of yokes 18, 18. The yokes 18, 18 are provided in the forward ends 19, 19 thereof with eyes to receive the said pivot bolts 16, 16.

The swingletrees 17 are constructed of light bar metal, and are formed from two members 20 and 21. The members 21 are provided with a down-turned reinforcing edge 22, arranged substantially as shown in Fig. 2 of the drawings, and provided to give to the structure rigidity to prevent bending in a vertical plane. The members 20 and 21 are riveted at 23, 23 to the flattened shanks 24, 24 of trace hooks 25, 25. In the central portion of the swingletrees they are reinforced in truss-like structure by plates 26, 26. The plates 26, 26 prevent the collapsing of the truss-like frame of the swingletrees. This form of construction provides for the maximum strength with the minimum weight.

The levers 14, 14 are bent to form rearward longitudinal extensions 27, 27. Depended from the edge of the extensions 27, 27 are flange plates 28, 28. The plates 28, 28 are provided to receive the anchoring ends of springs 29, 29. The springs 29, 29 are arranged to normally exert a pull upon the plates 28, 28 to draw the same together. By reason of this construction it will be noticed that each plate 28 forms an anchorage for the spring 29 and the opposite plate 28 connected therewith. Hence, if in the operation of the whiffle-tree, the strain is produced upon the one swingletree and the lever 14 connected therewith, the opposite swingletree and the lever 14 connected with it forms the anchorage for the expansion of the springs 29, 29 and for the return by the said springs of the said lever 14 and swingletree connected therewith. This is equally true of unequal displacements of each of the swingletrees and levers 14 connected therewith, as will be hereinafter more fully described. Extended from the plates 28, 28 of the extensions 27, 27 are laterally extended springs 30, 30. The springs 30, 30 are anchored at 31, 31 to the frames 10, 10, and serve the purpose of returning the parts to their normal and initially adjusted position.

In the operation the pole for the vehicle is placed in the socket 7 of the brace 5, being supported therein in part by the bar 4. The animals constituting the team are hitched to the trace hoops 25, 25 of each of the swingletrees. The tugs used in the harness are non-resilient throughout, the cushion for the draft thrust being formed by the springs 29, 29. The springs 29, 29, operating through the levers 14 upon which the swingletrees are pivotally mounted, produce an even pressure on both shoulders of the animals, causing the collar to seat more evenly, and thus avoiding shoulder sores. The team being hitched and started, the levers 14, 14 are immediately adjusted by any inequality of strain to equalize the pull upon both members of the team. As illustrative of the operation of the equalizing levers 14, 14, I have shown in Fig. 3, in diagrammatic view, the result, if unchecked, of the pull on the swingletree $a$ therein shown. This result is shown as having pulled the swingletree $b$ back, or to the rear of the whiffle-tree $c$. The diagram illustrates the extreme of the positions. In practice, the lagging horse would, in this position, be pulled backward until interfered with by the swing of the lever 14, a position obvious to the driver. In all positions, however, of the levers 14, 14, all sudden jerks or impacts otherwise received as a blow upon the shoulders of the animals, are cushioned by the expansion of the springs 29, 29, thereby easing the strain on the harness and upon the animals. If, in the handling of his team, a driver, for any reason, desires to favor one of the animals, this may be accomplished by moving the pivot bolt 13 to the inner perforation 12, thereby increasing the leverage of the levers 14 over the contracted strain of the springs 29. The operation of the springs 29, 29 and the levers 14, 14 is regulated by the laterally extended springs 30, 30, these operating to steady the movement of the levers 14 to return the same to the initial position substantially as shown in Fig. 1 of the drawings.

Having thus described my invention, what I claim as new and desire to secure by Letters Patent is:—

1. A whiffletree, comprising a rigid cross bar fixedly mounted on the body structure of a vehicle; a plurality of flat metal levers having rearward extensions and ends overturned upon the opposite ends of said cross bar to be guided thereby; a plurality of swingletrees, each connected to the outer ends of said levers; a plurality of pivot bolts for said swingletrees, said bolts passing through both layers of the overturned ends of said levers; resilient connections for said levers disposed between the said rearward extensions to draw the ends thereof toward each other; and balancing springs connecting the said rearward extensions and the body of the vehicle to maintain the rearward extensions in normal position to extend the overturned ends of said levers in parallel relation with said cross bar.

2. A whiffletree, comprising a rigid cross bar fixedly mounted on the body structure of a vehicle and having in the opposite ends thereof a series of longitudinally disposed perforations to receive a pivot bolt; a plurality of levers having overturned ends to receive the said cross bar in guided relation thereto, said levers having angularly disposed rearward extensions and provided with a series of longitudinally disposed perforations to receive the pivot bolt mounted in the ends of said cross bar; resilient means arranged to retain the overturned ends of said levers in parallel relation with said cross bar; a plurality of swingletrees adapted to be pivotally secured to the end of each of said levers; and a plurality of pivot bolts adapted to be extended through the ends of said levers and the said cross bar.

In testimony whereof I have signed this specification in the presence of two subscribing witnesses.

OTTO H. SMITH.

Witnesses:
 JOHN HENRY RUPERT,
 GEORGE W. STUART.